(12) United States Patent
Luo et al.

(10) Patent No.: US 11,249,491 B2
(45) Date of Patent: Feb. 15, 2022

(54) SERVO, CONTROL METHOD, AND UNMANNED AERIAL VEHICLE

(71) Applicant: SZ DJI TECHNOLOGY CO., LTD., Shenzhen (CN)

(72) Inventors: Hao Luo, Shenzhen (CN); Di Ou, Shenzhen (CN); Chaobing Chen, Shenzhen (CN); Dayang Zheng, Shenzhen (CN); Wentao Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 342 days.

(21) Appl. No.: 16/395,875

(22) Filed: Apr. 26, 2019

(65) Prior Publication Data
US 2019/0250642 A1 Aug. 15, 2019

Related U.S. Application Data

(63) Continuation of application No. PCT/CN2016/103650, filed on Oct. 27, 2016.

(51) Int. Cl.
*B64C 13/00* (2006.01)
*G05D 1/10* (2006.01)
(Continued)

(52) U.S. Cl.
CPC ............ *G05D 1/101* (2013.01); *B64C 13/50* (2013.01); *B64C 27/58* (2013.01); *B64C 27/72* (2013.01);
(Continued)

(58) Field of Classification Search
CPC ........ G05D 1/101; B64C 13/50; B64C 27/72; B64C 39/024; B64C 27/58;
(Continued)

(56) References Cited

U.S. PATENT DOCUMENTS 5,252,902 A * 10/1993 Uehara .............. G05B 19/4141
318/599
5,252,903 A * 10/1993 Maruyama ............. G02B 7/102
318/696

(Continued)

FOREIGN PATENT DOCUMENTS

CN 202754140 U 2/2013
CN 202923880 U 5/2013
(Continued)

OTHER PUBLICATIONS

World Intellectual Property Organization (WIPO) International Search Report for PCT/CN2016/103650 dated Jul. 14, 2017 8 Pages.

*Primary Examiner* — Ian Jen
(74) *Attorney, Agent, or Firm* — Anova Law Group, PLLC (57) ABSTRACT

An unmanned aerial vehicle (UAV) includes a central part, a frame assembly, and a propulsion assembly mounted to the frame assembly. The UAV also includes a servo mounted to the central part. The servo includes a driving apparatus, a control apparatus operably coupled with the driving apparatus, and a sensor configured to obtain operating parameters of the driving apparatus. The operating parameters include operating positions of the driving apparatus. The control apparatus is configured to control the driving apparatus to rotate to a predetermined position and stay at the predetermined position based on the operating positions of the driving apparatus obtained by the sensor.

20 Claims, 8 Drawing Sheets

(51) Int. Cl.
     *B64C 13/50*         (2006.01)
     *B64C 27/72*         (2006.01)
     *B64C 39/02*         (2006.01)
     *B64C 27/58*         (2006.01)
(52) U.S. Cl.
     CPC .... *B64C 39/024* (2013.01); *B64C 2027/7205* (2013.01); *B64C 2201/027* (2013.01)
(58) Field of Classification Search
     CPC ...... B64C 2201/027; B64C 2027/7205; G05B 19/4062; G05B 19/414; G05B 19/4141; G05B 21/00; G05B 23/02; G05B 2219/1167
     See application file for complete search history.

(56) References Cited

U.S. PATENT DOCUMENTS

| | | | |
|---|---|---|---|
| 2013/0226391 A1* | 8/2013 | Nordbruch | G06F 17/00 701/29.3 |
| 2014/0263823 A1* | 9/2014 | Wang | B64C 1/063 244/17.23 |
| 2016/0272312 A1* | 9/2016 | Mallard | B64C 29/0033 |

FOREIGN PATENT DOCUMENTS

| | | |
|---|---|---|
| CN | 203306225 U | 11/2013 |
| CN | 103921933 A | 7/2014 |
| EP | 2403757 B1 | 4/2014 |

* cited by examiner

SERVO, CONTROL METHOD, AND UNMANNED AERIAL VEHICLE

CROSS-REFERENCE TO RELATED APPLICATION

This application is a continuation application of International Application No. PCT/CN2016/103650, filed on Oct. 27, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the technology field of servo and, more particularly, to a method of controlling a servo, and an unmanned aerial vehicle (UAV) that uses the servo.

BACKGROUND

Servos have been widely used in various fields, such as marine, aviation, robotics, etc., for controlling the adjustment of the attitude. For example, the servo on a UAV may be used to control an arm of the UAV to move relative to a body of the UAV in order to change the attitude of the UAV. Servos used in currently available UAVs typically perform the control through a pulse width modulation ("PWM") signal generated or transmitted by a control device (e.g., a central control board provided on the UAV). This one-way control method, however, cannot directly obtain information related to the servo during the operation of the servo, such as the operating position, current, and voltage, etc. Thus, the current technology cannot determine whether the servo correctly rotates to a predetermined position, and whether the operating status is healthy and in good condition. Thus, the currently available servos typically can only switch between pre-set one or multiple operating positions, and cannot arrive and stay at any predetermined position.

SUMMARY

Thus, there is a need for a control method that can obtain information relating to the operating status of the servo, and a UAV that uses the servo.

In accordance with the present disclosure, there is provided an unmanned aerial vehicle (UAV). The UAV includes a central part and a frame assembly. The UAV also includes a propulsion assembly mounted to the frame assembly and a servo mounted to the central part. The servo includes a driving apparatus, a control apparatus operably coupled with the driving apparatus, and a sensor configured to obtain operating parameters of the driving apparatus. The operating parameters include operating positions of the driving apparatus. The control apparatus is configured to control the driving apparatus to rotate to a predetermined position and stay at the predetermined position based on the operating positions of the driving apparatus obtained by the sensor.

In various embodiments of the present disclosure, the control device of the servo can obtain the operating position of the servo, and precisely control the servo to rotate and arrive at a predetermined position based on the operating position, and stay at the predetermined position.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

LIST OF ELEMENTS

UAV 1000
Central part 1
Transmission mechanism 10
Screw 11
Nut 12
First shaft sleeve bracket 14
First shaft sleeve hole 140
Second shaft sleeve bracket 16
Second shaft sleeve bracket hole 160
Third shaft sleeve bracket 17
Control device 18
Servo 2
Driving apparatus 20
Control apparatus 22
Position detector 24
Current detector 26
Storage device 28
Frame assembly 3
Linkage assembly 4
Primary link 40
Primary link body 400
First connecting mechanism 402
First fixing part 4020
First connecting part 4021
First pivot connection hole 40210
Second connecting part 4022
Main body part 40220
First rotation shaft hole 40222
Second rotation shaft hole 40224

Second connecting mechanism 404
Second fixing part 4040
First arm connecting part 4042
Secondary link 42
Secondary link body 420
Third connecting mechanism 422
Third fixing part 4220
Third connecting part 4221
Fourth connecting mechanism 424
Fourth fixing part 4240
Second arm connecting part 4242
Sleeve assembly 42422
Fourth connecting part 42424
Arm 5
Propulsion assembly 6
Supporting structure 7
Electrical connector 8

DETAILED DESCRIPTION OF THE EMBODIMENTS

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Example embodiments will be described with reference to the accompanying drawings, in which the same numbers refer to the same or similar elements unless otherwise specified.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "left," "right," "up," "upward," "upwardly," "down," "downward," "downwardly," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

The term "communicatively coupled" indicates that related items are coupled through a communication chancel, such as a wired or wireless communication channel.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

Figure 1:
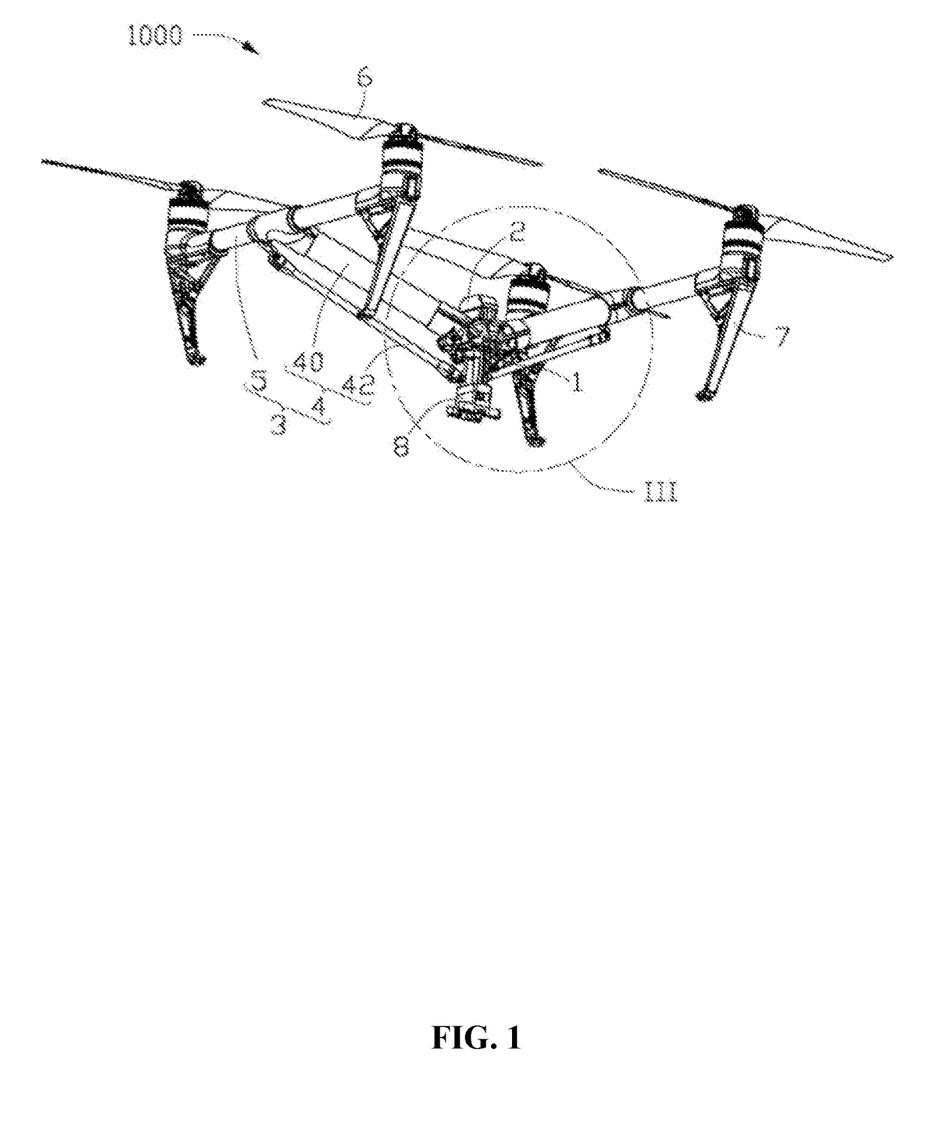
FIG. 1 is a perspective view of a UAV according to an example embodiment.

FIG. 1 is an example UAV. A UAV 1000 may include a central part 1, a servo 2 mounted to the central part 1, a frame assembly 3, a propulsion system including one or more propulsion assemblies 6, and a supporting structure 7. In some embodiments, the frame assembly 3 includes one or more linkage assemblies 4 and one or more arms 5. A proximal end of a linkage assembly 4 may be connected with the central part 1, and a distal end of the linkage assembly 4 may be connected to one of the arms 5. The arms 5 may be configured to support the propulsion assemblies 6.

The propulsion assemblies 6 may be configured to provide propulsion forces to enable the UAV 1000 to take off, land, or suspend in the air, and to move freely in three degrees of freedom in translation, and three degrees of freedom in rotation. In some embodiments, the propulsion assemblies 6 may include one or more rotors. Each rotor may include one or more rotor blades (or propellers) connected to a rotating shaft. The rotor blade or the rotating shaft may be driven to rotate by a suitable driving mechanism, such as a motor. Although the propulsion assemblies 6 of the UAV 1000 are depicted to include four rotors, the propulsion assemblies 6 may include any other suitable number of rotors, any other type of rotors or configuration of the rotors. For example, the number of the rotors may be 1, 2, 3, 4, 5, 6, 7, 8, or more. The rotors may be disposed horizontally, vertically, or at any other suitable angles relative to the UAV 1000. The angle of the rotors relative to the UAV 1000 (e.g., relative to a horizontal axis of the UAV 1000) may be fixed or may be variable. A distance between the axes of rotation of the rotors may be any suitable distance, such as smaller than or equal to 2 meters, or smaller than or equal to 5 meters. In some embodiments, the distance may vary between 40 centimeters to 1 meter, between 10 centimeters to 2 meters, or between 5 centimeters to 5 meters. In some embodiments, the propulsion assemblies 6 may be driven by any suitable motors, such as a direct current motor (e.g., brushed or brushless), or an alternating current motor. The motors may be used to drive the propellers to rotate.

In some embodiments, the UAV 1000 may include at least two linkage assemblies 4. The at least two linage assemblies 4 may be symmetrically or asymmetrically disposed relative to the central part 1. Each linkage assembly 4 may be coupled with an arm 5 and configured to support the arm 5.

Each arm 5 may be coupled to the linkage assembly 4 at a distal end away from the transmission mechanism. Each arm 5 may be configured to support a single propulsion assembly 6 or multiple propulsion assemblies 6 included in the propulsion system. In some embodiments, the multiple propulsion assemblies 6 may be evenly distributed on the arms 5. In some embodiments, each arm may support a different number of propulsion assemblies 6.

In some embodiments, the arms 5 may be disposed at a suitable angle or angles relative to the linkage assembly 4. For example, the arms 5 may extend from the linkage assembly 4 in a direction that is perpendicular or approximately perpendicular to the linkage assembly 4. In some embodiments, the arms 5 may be connected to the linkage assembly 4 at any part, such as the middle part of each arm 5, or a part that is close to the middle part of each arm 5. The arms 5 may be configured to support the multiple propulsion assemblies 6 (e.g., 1, 2, 3, 4, or more propulsion assemblies 6). In some embodiments, the propulsion assemblies 6 may be mount to any suitable part of the arms 5. For example, the propulsion assemblies 6 may be mounted to end portions of the arms 5. In some embodiments, the propulsion assemblies 6 may be symmetrically disposed on the arms 5. For example, the end portion of each arm 5 may be mounted with a propulsion assembly 6. In some embodiments, the propulsion assemblies 6 may be asymmetrically disposed on the arms 5.

In some embodiments, the UAV 1000 includes a supporting structure 7. The supporting structure 7 may be straight, bent, or curved. In some embodiments, two opposing ends of each arm 5 may be provided with a supporting structure 7. The supporting structure 7 may be configured to support the UAV 1000 on a surface. In some embodiments, the supporting structure 7 may be used as a landing gear for UAV 1000. For example, each supporting structure 7 may contact the surface at 1, 2, 3, 4, or more points. In some embodiments, the supporting structure 7 may support the UAV 1000 when the UAV 1000 lands on a surface or before the UAV 1000 takes off from the surface. The supporting structure 7 may be coupled to any suitable portion of arms 5, such as at a portion adjacent a distal end or a proximal end of each arm 5. For example, in some embodiments, the supporting structure 7 may be disposed at a portion of an arm 5 that is away from a distal end of the arm 5 with a distance of about $1/10$, $1/5$, $1/4$, $1/3$, $1/2$, $3/4$, $2/3$, $4/5$, or $9/10$ of the total length of the arm 5. In some embodiments, the supporting structure 7 may be disposed adjacent a propulsion assembly 6, such as underneath the propulsion assembly 6. The supporting structure 7 may be coupled with the propulsion assembly 6. In some embodiments, the supporting structure 7 is stationary. In some embodiments, the supporting structure 7 is movable relative to the arm 5. For example, the supporting structure 7 may move in one or more of the following manners: sliding, rotating, extending and retracting, folding, pivoting, extending, retracting, etc.

In some embodiments, the frame assembly 3 may change between positions of different angles relative to the central part 1, and may stay at a position of a specific angle. In some embodiments, the UAV 1000 may stay at any position of any suitable angle between a first state and a second state. In some embodiments, the first state is an angular position limit in a downward direction, and the second state is an angular position limit in an upward direction. The upward angle and the downward angle may be defined by an end of the linkage assembly 4 distant from the central part 1 relative to a horizontal axis passing through a center of gravity of the central part 1 or a vertical center point of the central part 1.

In some embodiments, in the first state, the UAV 1000 is supported on a surface through the supporting structure. In some embodiments, the first state may be a landing state or a surface contacting state. In the landing state or surface contacting state, when the UAV 1000 is supported on a surface, the central part 1 or components mounted under the central part 1 (e.g., various payloads) may contact the surface. The second state may be a flight state. The second state may reduce the interference of one or more components of the UAV 1000 to the various payloads carried by the central part 1.

In some embodiments, multiple frame assemblies 3 may be connected with one another, thereby enabling simultaneous positions changing for the multiple frame assemblies 3. Alternatively or additionally, the multiple frame assemblies 3 may change their positions individually and independently.

Figure 2:
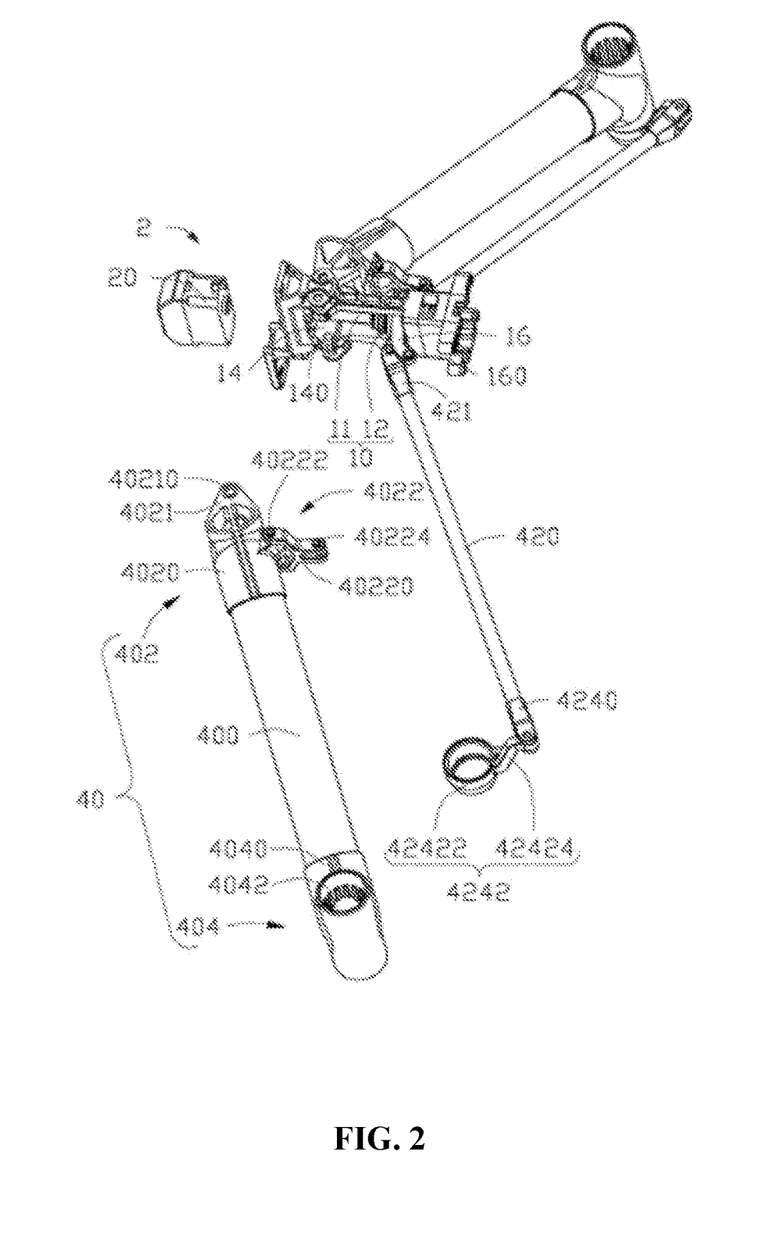
FIG. 2 is an exploded view of a portion of the UAV according to an example embodiment.

In some embodiments, the position change of the frame assembly 3 relative to the central part 1 may be achieved through a driving apparatus provided in the servo 2 and a transmission mechanism provided in the central part 1. In some embodiments, a single driving apparatus and transmission mechanism may simultaneously change positions of multiple frame assemblies 3 of the UAV 1000. For example, a single motor or other suitable driving apparatus may be used to change positions of multiple or all of the frame assemblies 3 included in the UAV 1000. In some embodiments, multiple driving apparatuses and transmission mechanisms may be used to change positions of each frame assembly 3. In some embodiments, the driving apparatus may be any suitable driving unit, such as a direct current motor (brushed or brushless), an alternating current motor, a stepper motor, a servo motor, or any other types of motors. The transmission mechanism may include any suitable structure or configuration. For example, the transmission mechanism may include gears, rotating shaft, pulley, screw, nut shaft, belt, cable, wheel, shaft, or other types of suitable devices or structures. In some embodiments, the transmission mechanism may include a linear driving device. The linear driving device may linearly move back and forth relative to the driving apparatus. For example, as shown in FIG. 2, transmission mechanism 10 may be a screw and nut transmission mechanism including a screw 11 and a nut 12. The nut 12 may be disposed around the threaded shaft of the screw 11. The nut 12 may be coupled with the screw 11, e.g., by engaging threads provided on the shaft of the screw 11 with threads provided on an inner wall of the nut 12, or by interference fit. The driving apparatus 20 in the servo 2 may be fixed or mounted to an end of the screw 11. Thus, the driving apparatus 20 may drive the screw 11 to rotate (e.g., clockwise or counter-clockwise), thereby causing the nut 12 to move up and down (or back and forth) along the longitudinal direction of the screw 11.

In some embodiments, the transmission mechanism may include a turbo transmission mechanism including a worm and a worm gear (not shown). The worm may be connected to the worm gear, such that when the driving apparatus 20 drives the worm to rotate, the worm gear also rotates. The worm gear may be connected with the screw 11 to drive the screw 11 (e.g., through inner threads of the worm gear). In some embodiments, the worm gear transmission mechanism may provide more smooth driving transmission, thereby improving the driving reliability.

In some embodiments, the linkage assembly 4 includes a primary link 40 and a secondary link 42. The primary link 40 and the secondary link 42 may be disposed substantially in parallel with one another. The primary link 40 may be connected with the nut 12 and may be rotatable relative to the central part 1 when the nut 12 moves along the screw 11. The movement of the primary link 40 may cause the arm 5 that is disposed on the primary link 40 to move. The movement of the arm 5 may cause the secondary link 42 to rotate relative to the central part 1, thereby achieving consequential movement between the primary link 40 and the secondary link 42.

In some embodiments, the primary link 40 includes a primary link body 400, a first connecting mechanism 402 provided at an end of the primary link body 400 that is connected with the central part 1, and a second connecting mechanism 404 provided at the other end of the primary link body 400 that is connected with the arm 5. The first connecting mechanism 402 may enable the linkage assembly 4 to rotate relative to the central part 1 caused by the transmission mechanism 10 provided in the central part 1. The second connecting mechanism 404 may be mounted onto the arm 5 through a sleeve, thereby connecting the arm 5 with the linkage assembly 4.

In some embodiments, the first connecting mechanism 402 includes a first fixing part 4020 fixed at an end of the primary link body 400, a first connecting part 4021 provided at an end of the first fixing part 4020 distant from the primary link body 400, and a second connecting part 4022 provided at a side of the first fixing part 4020. In the embodiment shown in FIG. 2, the first fixing part 4020 is a sleeve tube mounted on the primary link body 400. The sleeve tube and the primary link body 400 may be fixedly mounted together through a suitable fixing structure or configuration, such as an interference fit, threads fit, or snap fit, etc., thereby enabling the primary link body 400 to rotate as the first fixing part 4020 rotates.

In some embodiments, the first connecting part 4021 may be provided with a first pivot connection hole 40210, through which the first connecting part 4021 may be rotatably (e.g., pivotably) connected with the central part 1. The central part 1 may be provided with a first shaft sleeve bracket 14, which includes a first shaft sleeve hole 140. The first connecting part 4021 may be rotatably connected with the central part 1 through a shaft, rod, or pin inserted into the first pivot connection hole 40210 and the first shaft sleeve hole 140. In the embodiments shown in the figures, two first shaft sleeve brackets 14 are shown, and the first connecting part 2011 may be sandwiched between the two first shaft sleeve brackets 14.

In some embodiments, the second connecting part 4022 includes a main body part 40220, and a first rotation shaft hole 40222 and a second rotation shaft hole 40224 provided on the main body part 40220. The second connecting part 4022 may be rotatably connected to an outer side wall of the first fixing part 4020 through the first rotation shaft hole 40222. The second connecting part 4022 may be rotatably connected to the transmission mechanism 10 through the second rotation shaft hole 40224. The nut 12 of the transmission mechanism 10 may be fixedly connected with a second shaft sleeve bracket 16, which has a second shaft sleeve bracket hole 160. The second connecting part 4022 may be connected to the nut 12 through a shaft, rod, or pin inserted into the second shaft sleeve bracket hole 160 and the second rotation shaft hole 40224. In the embodiment shown in FIG. 2, the main body part 40220 has a substantially Y shape. The first rotation shaft hole 40222 may be provided at two ends of an outer side wall of the Y-shaped main body part 40220, where the outer side wall is adjacent the first fixing part 4020. An end of the Y-shaped main body part 40220 that is adjacent the second shaft sleeve bracket 16 may be pivotably connected with the second shaft sleeve bracket 16. The second shaft sleeve bracket 16 has a bent shape and extends from an outer side wall of the nut 12 in a direction away from the nut 12. The second shaft sleeve bracket hole 160 may be provided at an end of the second shaft sleeve bracket 16 that is distant from the nut 12.

In some embodiments, the second connecting mechanism 404 has a substantially T shape, and includes a second fixing part 4040 and a first arm connecting part 4042 that is provided at an end of the second fixing part 4040 distant from the primary link body 400. In the embodiment shown in FIG. 2, the second fixing part 4040 is a sleeve tube mounted onto the primary link body 400. The sleeve tube and the primary link body 400 may be fixedly coupled with one another through a suitable fixing structure or configuration, such as an interference fit, threads fit, or snap fit, etc., thereby enabling the primary link body 400 to rotate as the first fixing part 4020 rotates. In some embodiments, the first arm connecting part 4042 may extend perpendicularly from the second fixing part 4040 in a direction away from the primary link body 400. The first arm connecting part 4042 may be provided around the arm 5. In the embodiment shown in FIG. 2, the first arm connecting part 4042 has a substantially cylinder shape mounted on the arm 5. In some embodiments, the arm 5 is rotatable relative to the first arm connecting part 4042.

In some embodiments, the secondary link 42 includes a secondary link body 420, a third connecting mechanism 422 that is provided at an end of the secondary link body 420, which is connected to the central part 1. In some embodiments, the secondary link 42 also includes a fourth connecting mechanism 424 provided at the other end of the secondary link body 420, which is connected to the arm 5. The third connecting mechanism 422 may be rotatably connected to the central part 1, and may be rotatable relative to the central part 1. The fourth connecting mechanism 424 may be mounted onto the arm 5 through a sleeve, thereby connecting the arm 5 with the secondary link 42.

Figure 3:
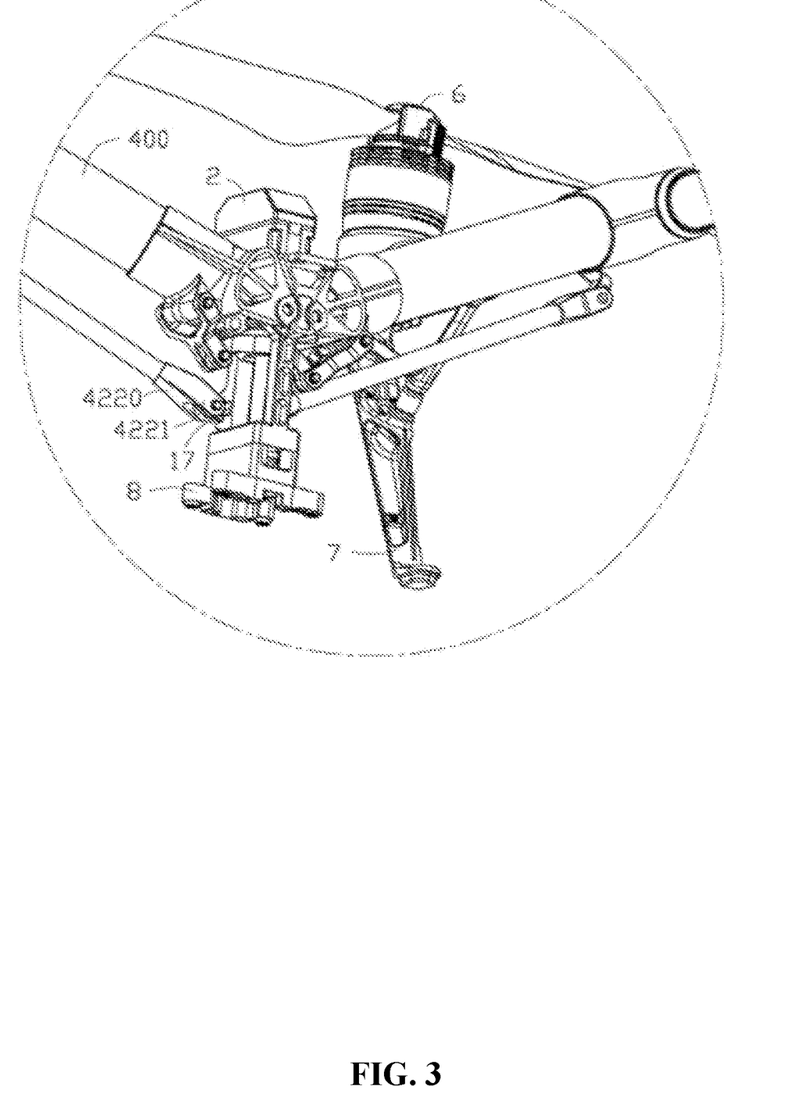
FIG. 3 is an enlarged view of a local portion of the UAV when the UAV is in a first state according to an example embodiment.

Referring to FIG. 3, in some embodiments, the third connecting mechanism 422 includes a third fixing part 4220 that is fixedly connected with the secondary link body 420, and a third connecting part 4221 that is provided at an end of the third fixing part 4220 distant from the secondary link body 420. As shown in FIG. 3, the third fixing part 4220 is a sleeve tube mounted onto the secondary link body 420. The sleeve tube and the secondary link body 420 may be fixedly coupled with one another through a suitable fixing structure or configuration, such as an interference fit, threads fit, or snap fit, etc., thereby enabling the secondary link body 420 to rotate as the third fixing part 4220 rotates.

The third connecting part 4221 may be provided with a third rotation shaft hole (not shown), through which the third connecting part 4221 rotatably connects with the central part 1. In some embodiments, the central part 1 is provided with a third shaft sleeve bracket 17, which is provided with a third shaft sleeve bracket hole (not shown). In some embodiments, the third connecting part 4221 is rotatably connected with the central part 1 through a shaft, rod, or pin inserted into the third rotation shaft hole and the third shaft sleeve bracket hole. The embodiment shown in FIG. 3 includes two third connecting parts 4221. The third shaft sleeve bracket 17 may be sandwiched between the two third connecting part 4221.

In some embodiments, the fourth connecting mechanism 424 includes a fourth fixing part 4240 and a second arm connecting part 4242 pivotably connected with the fourth fixing part 4240. In the embodiment shown in FIG. 2, the fourth fixing part 4240 is a sleeve tube mounted onto the secondary link body 420. The sleeve tube and the secondary link body 420 may be fixedly coupled with one another through a suitable fixing structure or configuration, such as an interference fit, threads fit, or snap fit, etc., thereby enabling the secondary link body 420 to rotate as the fourth fixing part 4240 rotates. In some embodiments, the second arm connecting part 4242 includes a sleeve assembly 42422 and a fourth connecting part 42424. The fourth connecting part 42424 may be rotatably connected with an end of the fourth fixing part 4240 that is distant from the secondary link body 420. In some embodiments, the fourth connecting part 42424 has a bent shape. In the embodiment shown in FIG. 2, the fourth connecting part 42424 has a substantially S shape. In some embodiments, the sleeve assembly 42422 surrounds the arm 5. In some embodiments, the sleeve assembly 42422 has a substantially cylinder shape mounted onto the arm 5. In some embodiments, the arm 5 may rotate relative to the second arm connecting part 4242.

Figure 4:
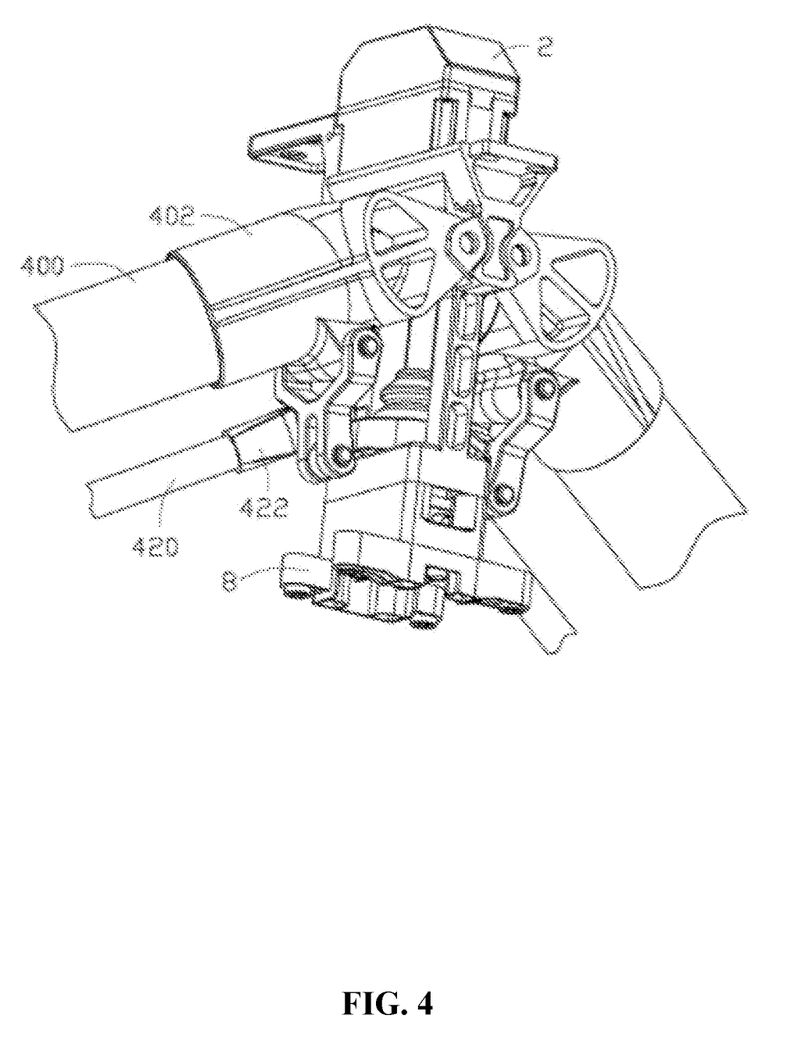
FIG. 4 is an enlarged view of a local portion of the UAV when the UAV is in a second state according to an example embodiment.

In some embodiments, when the nut 12 moves upwardly along the screw 11, the primary link 40 may move upwardly relative to the central part 1, and the arm 5 moves upwardly along with the primary link 40, thereby causing the secondary link 42 to move upwardly, as shown in FIG. 3. When the nut 12 moves downwardly along the screw 11, the primary link 40 also moves downwardly relative to the central part 1, and the arm 5 moves downwardly along with the primary link 40, thereby causing the secondary link 42 to move downwardly, as shown in FIG. 4.

In some embodiments, the UAV 1000 includes an electrical connector 8 configured to provide power to the propulsion assemblies 6 that are mounted on the arm 5. The wire connections between the electrical connector 8 and the propulsion assemblies 6 may be disposed within the primary link 40 and/or the arm 5. In some embodiments, the propulsion assemblies 6 may be powered by a power source (e.g., a battery) disposed inside the central part 1.

In some embodiments, the secondary link 42 may be omitted, or the UAV 1000 may include two or more secondary links 42. The secondary link 42 can increase the stability of the frame assembly 3 relative to the central part 1. The number of the secondary link 42 can be set based on specific applications or needs, as long as the secondary link 42 can move as the primary link 40 moves.

Figure 5:
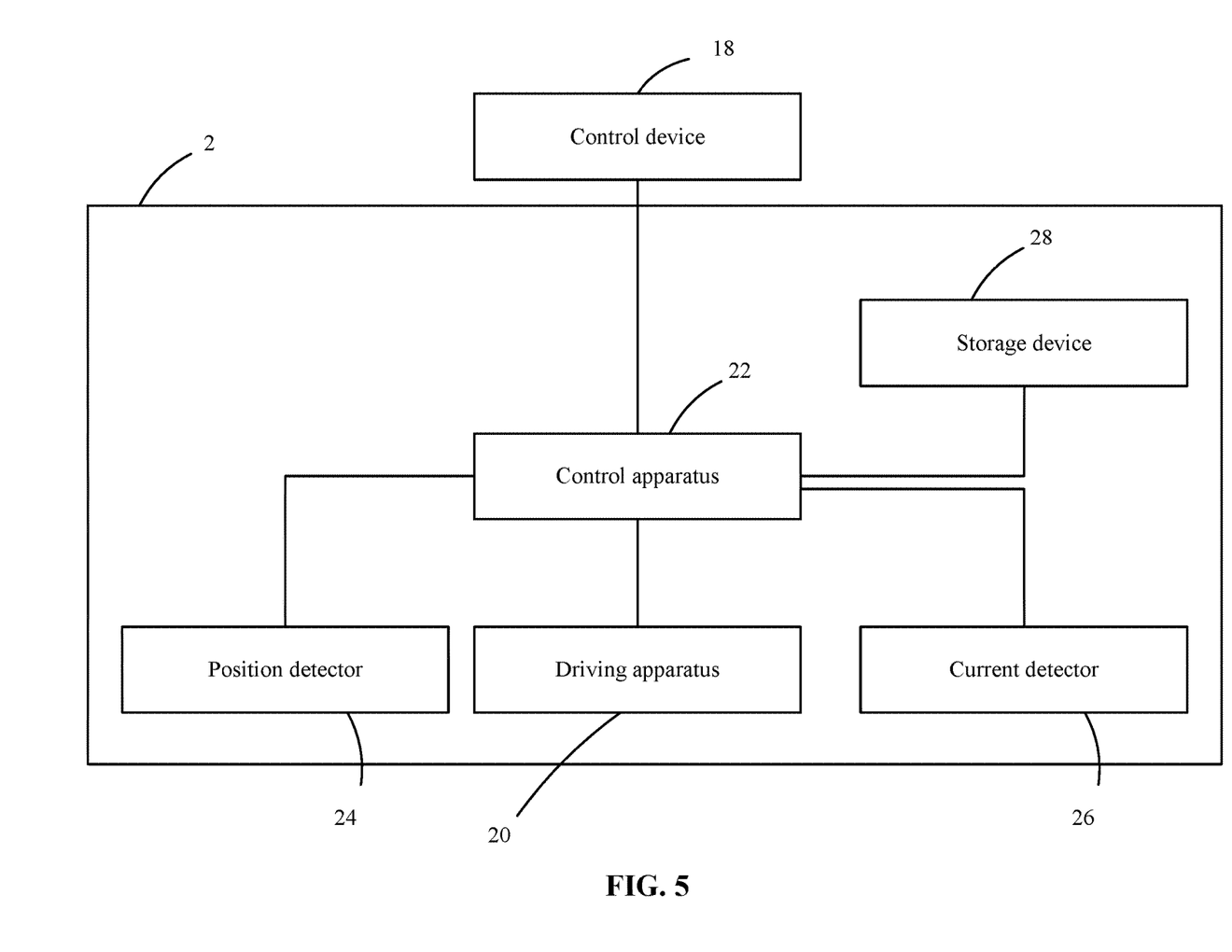
FIG. 5 is a schematic diagram of a servo according to an example embodiment.

Referring to FIG. 5, the servo 2 includes a driving apparatus 20, a control apparatus 22, a position detector 24, and a current detector 26. The control apparatus 22 may be a microcontroller. In some embodiments, the control apparatus 22 is operably coupled with a control device 18 to receive control commands (or signals) from the control device 18 to control the driving apparatus 20 to drive the transmission mechanism 10 to move, thereby causing the frame assembly 3 to move relative to the central part 1. The control device 18 may be provided inside the central part 1 (e.g., the control device 18 may be the central control board of the UAV 1000), or may be a remote control device. The control device 18 may be communicatively coupled with the control apparatus 22 and may communicate with the control apparatus 22 through a wired or wireless communication. Wired communication may include serial communication or parallel communication. The serial communication may include a serial peripheral interface ("SPI"), a universal asynchronous receiver-transmitter ("UART"), an inter IC bus ("I2C"), etc.

In some embodiments, the signal used by the control apparatus 22 to control the driving apparatus 20 may be a pulse width modulation ("PWM") signal. The driving apparatus 20 may include at least one of a direct current motor or an alternating current motor. For example, when the driving apparatus 20 includes a direct current motor, the PWM signal generated by the control apparatus 22 is provided to a signal modulation chip of the driving apparatus 20 to obtain a DC bias voltage. The driving apparatus 20 may include a reference circuit configured to generate a reference signal having a time width of 1.5 milli-second (ms) at an interval of 20 ms. When the DC bias voltage is compared with a voltage of a potentiometer included in the driving apparatus 20, a voltage difference may be generated. The positiveness or the negativeness of the voltage difference is output to the driving chip of a motor to cause the motor to rotate in the clockwise direction or counter-clockwise direction based on the positiveness or negativeness of the voltage difference.

The position detector 24 may be configured to detect an angular position (e.g., an angle) of the motor. In some embodiments, the position detector 24 may include a rotation sensor configured to detect the number of rounds the motor rotates or turns. In some embodiments, the position sensor 24 may include a potentiometer configured to detect the angle or position of the motor as the motor rotates. In some embodiments, the position sensor 24 is connected with the control apparatus, and is configured to send the rotational position of the motor to the control apparatus 22. In some embodiments, the control apparatus 22 can send the position information to a remote control device. In some embodiments, the control apparatus 22 is configured to adjust the PWM signal based on the position information. For example, based on the control commands and the operating positions of the driving apparatus 20 (e.g., the rotational positions of the motor), the control apparatus 22 may accurately determine a relationship between control commands and the operating positions of the driving apparatus 20. The control apparatus 22 may accurately control the driving apparatus 20 to rotate to a predetermined position based on the relationship and the present position of the driving apparatus 20. The predetermined position may be any position between a first limiting position and a second limiting position. The first limiting position may be a limiting position of the driving apparatus 20 in a clockwise rotation direction. That is, when the driving apparatus 20 reaches the first limiting position, the driving apparatus 20 cannot continue rotating in the clockwise rotation direction. Similarly, the second limiting position may be a limiting position of the driving apparatus 20 in a counter-clockwise direction. That is, when the driving apparatus 20 reaches the second limiting position, the driving apparatus 20 cannot continue rotating in the counter-clockwise rotation direction.

In some embodiments, the current detector 26 is configured to detect a current in the motor. In some embodiments, the current detector 26 may sample the current supplied to the motor using a sampling resistor. The sampled current may be converted using a current/voltage (UV) converter, and may be amplified through an amplifier. The amplified signal may be input into the control apparatus 22. The control apparatus 22 may include an analog-to-digital converter (A/D converter) to convert the current and/or voltage of the motor into digital signals. The control apparatus 22 may send the digital signals to the remote control device. In some embodiments, the control apparatus 22 may include storage devices for storing information relating to the rated operating current of the motor. The control apparatus 22 may compare the current and/or voltage of the motor with the pre-stored rated operating current, and determine the operating status of the servo 2.

In some embodiments, the storage device 28 is operably coupled with the control apparatus 22. The storage device 28 may include one or more storage media (e.g., a removable media, secure digital (SD) cards, or external storage media such as a random-access-memory (RAM)). In some embodiments, data from the position detector 24 and the current detector 26 may be transmitted to and stored in the storage device 28. The storage device 28 may store logics, codes and/or commands or instructions that are executable by the control apparatus 22 to perform the disclosed methods. For example, the control apparatus 22 may be configured or programmed to execute computer-readable codes stored in the storage device 28 to analyze measurement data provided by the position detector 24 and the current detector 26. The storage device 28 may store the measurement data that may be analyzed by the control apparatus 22. In some embodiments, the storage device 28 may store results of data processing or analysis performed by the control apparatus 22.

In some embodiments, the servo 2 may include other sensors, such as temperature sensors to measure the temperature of servo 2.

Figure 6:
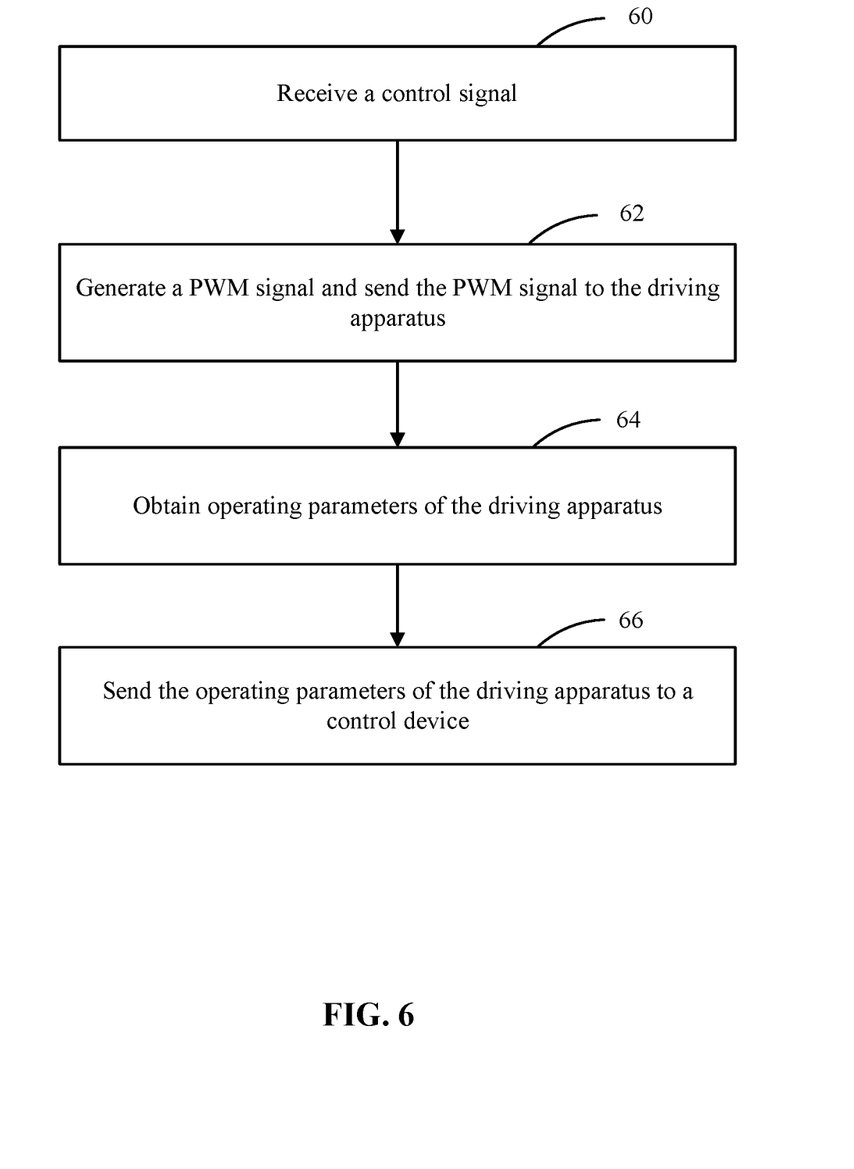
FIG. 6 is a flow chart illustrating a method for controlling the servo according to an example embodiment.

FIG. 6 is a flow chart illustrating a control method implemented by the control apparatus. Depending on the applications, the sequence of the steps may vary, and some steps may be combined or omitted.

In step 60, the control apparatus 22 receives a control signal from a control device 18.

In step 62, the control apparatus 22 generates a PWM signal based on the control signal received from the control device 18, and transmits the PWM signal to the driving apparatus 20.

In step 64, the control apparatus 22 obtains operating parameters of the driving apparatus 20. For example, the control apparatus 22 may obtain the position information from the position detector 24, and may obtain the operating current and/or voltage of the driving apparatus 20 from the current detector 26.

In step 66, the control apparatus 22 sends the operating parameters of the driving apparatus 20 to the control device 18. The control device 18 may determine the health status of the servo 2 based on the operating parameters of the driving apparatus 20. The control device 18 may determine whether the driving apparatus has reached a predetermined position. For example, when the driving apparatus 20 has not reached the predetermined position, the control device 18 may determine that there is failure in the position change for the servo 2, and the commands for changing the position need to be re-sent. In some embodiments, when the operating current of the servo 2 is greater than or is lower than a predetermined rated current, the control device 18 may determine that the servo 2 cannot continue to operate normally, and safety measures need to be taken. Information relating to the failure in the position change for servo 2, and information relating to the abnormal operation of the servo 2 may be transmitted to a remote control device through a communication device, such as a wireless communication device or circuit, such that an operator may take control measures based on the received information. The control measures may include making the UAV 1000 to return for maintenance, re-trying position change, etc. In some embodiments, based on the operating positions of the driving apparatus 20, the control device 18 may determine a relationship between control commands and operating positions of the driving apparatus 20, thereby adjusting the control commands to control the driving apparatus 20 to rotate to a predetermined position. The predetermined position may be any position between two limiting positions. The two limiting positions may be limiting positions in two opposite operating directions (e.g., rotating directions) of the driving apparatus 20. For example, the driving apparatus 20 may drive the nut 12 to move upwardly and downwardly along the screw 11. When the driving apparatus 20 rotates in one direction to reach one of the two limiting positions, the nut 12 reaches an upward limiting position. When the driving apparatus 20 rotates in another direction to reach the other one of the two limiting positions, the nut 12 reaches a downward limiting position.

Figure 7:
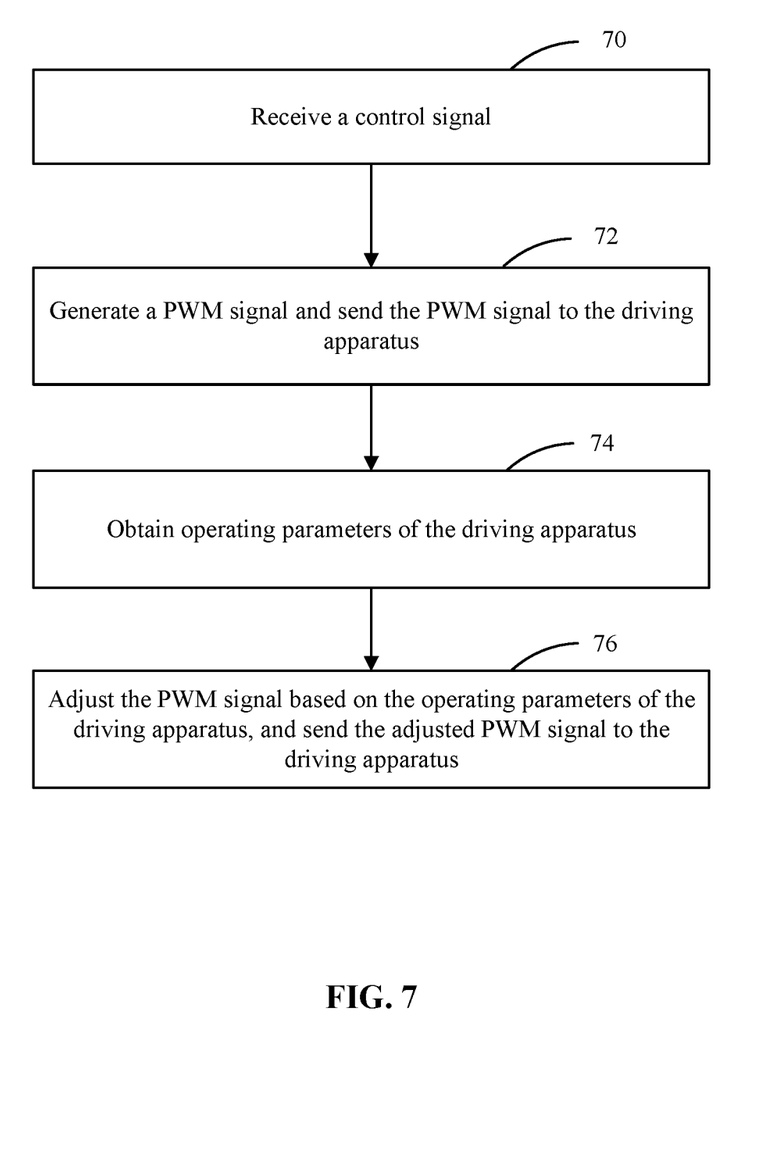
FIG. 7 is a flow chart illustrating a method for controlling the servo according to another example embodiment.

FIG. 7 is a flow chart illustrating a control method implemented by the control apparatus in accordance with another embodiment of the present disclosure. Depending on the applications, the sequence of the steps may vary, and some steps may be combined or omitted.

In step 70, the control apparatus 22 receives a control signal from the control device 18.

In step 72, the control apparatus 22 generates a PWM signal based on the control signal and sends the PWM signal to the driving apparatus 20.

In step 74, the control apparatus 22 obtains operating parameters of the driving apparatus 20. For example, the control apparatus 22 may obtain position information of the rotating motor of the driving apparatus 20 from the position detector 24, and may obtain the operating current and/or voltage of the driving apparatus 20 from the current detector 26.

In step 76, the control apparatus 22 may adjust the PWM signal based on the operating parameters of the driving apparatus 20. For example, the control apparatus 22 may compare the operating parameters pre-stored in the storage device 28 with the present operating parameters of the driving apparatus 20, and adjust the PWM signal based on a result of the comparison. For example, the control apparatus 22 may control, based on the control commands provided by the control device 18, the servo 2 to rotate to reach a predetermined position. The control apparatus 22 may determine, based on the position information of the driving apparatus 20 measured by the position detector 24, whether the driving apparatus 20 has reached the predetermined position. If the driving apparatus 20 has not reached the predetermined position, the control apparatus 22 may adjust the PWM signal based on the difference between the predetermined position and the present position of the driving apparatus 20, such that the servo 2 may reach the predetermined position. In some embodiments, the processes shown in FIG. 7 may be used to calibrate the driving apparatus 20.

In some embodiments, the control apparatus 22 may obtain, based on the operating position of the driving apparatus 20, a relationship between the PWM signal and the operating position, thereby adjusting the PWM signal to cause the driving apparatus 20 to reach any predetermined position. The predetermined position may be any position between two limiting positions. The two limiting positions may correspond to the limiting positions in two opposite operating directions of the driving apparatus 20. For example, when the driving apparatus 20 drives the nut 12 to move upwardly and downwardly along the screw 11, and when the driving apparatus 20 reaches a limiting position, the nut 12 may move upwardly to reach a limiting position. When the driving apparatus 20 operates (e.g., rotates) in an opposite direction to reach another limiting position, the nut 12 may move downwardly to reach another limiting position.

Figure 8:
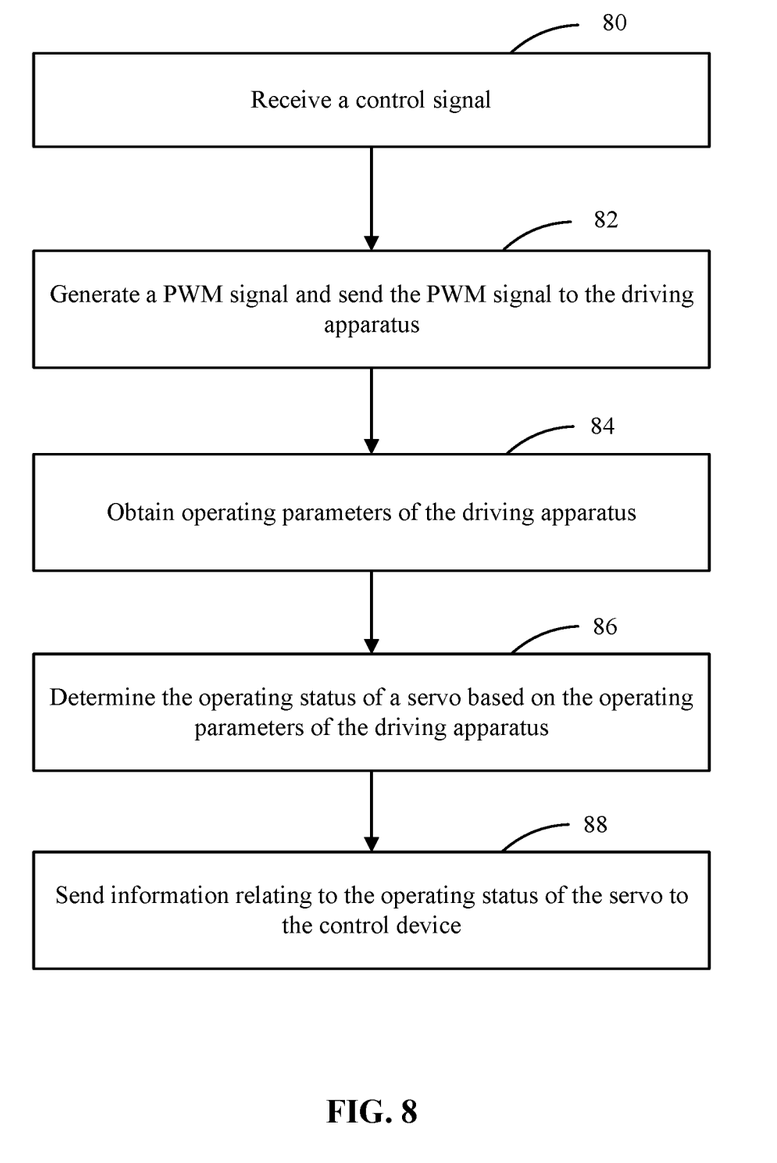
FIG. 8 is a flow chart illustrating a method for controlling the servo according to another example embodiment.

FIG. 8 is a flow chart illustrating another example control method implemented by the control apparatus. Depending on the applications, the sequence of the steps may vary, and some steps may be combined or omitted.

In step 80, the control apparatus 22 receives a control signal from the control device.

In step 82, the control apparatus 22 generates a PWM signal based on the control signal and sends the PWM signal to the driving apparatus 20.

In step 84, the control apparatus 22 obtains operating parameters of the driving apparatus 20. For example, the control apparatus 22 may obtain position information of the rotating motor of the driving apparatus 20 from the position detector 24, and obtain the operating current and/or voltage of the driving apparatus 20 from the current detector 26.

In step 86, the control apparatus 22 may determine the operating status of the servo 2 based on the operating parameters of the driving apparatus. The control apparatus 22 may determine the health status of the servo 2 based on the operating parameters of the driving apparatus 20. In some embodiments, the control apparatus 22 may determine whether the driving apparatus 20 has reached a predetermined position. For example, when the driving apparatus 20 has not reached the predetermined position, the control apparatus 22 may determine that there is failure in the position change for the servo 2, and the commands for changing the position need to be re-sent. In some embodiments, when the operating current of the servo 2 is greater than or is lower than a predetermined rated current, the control apparatus 22 may determine that the servo 2 cannot continue to operate normally, and safety measures need to be taken.

In step 88, the control apparatus 22 sends the information relating to the operating status of the servo to the control device 18. Information relating to the failure in position change and information relating to the abnormal operation of the servo 2 may be send to a remote control device through a communication device, such as a wireless communication device, thereby enabling an operator to take control measures based on such information. The control measures may include making the UAV 1000 to return for maintenance, re-trying position change, etc.

A person having ordinary skill in the art can appreciate that the various system, device, and method illustrated in the example embodiments may be implemented in other ways. For example, the disclosed embodiments for the device are for illustrative purpose only. Any division of the units are logic divisions. Actual implementation may use other division methods. For example, multiple units or components may be combined, or may be integrated into another system, or some features may be omitted or not executed. Further, couplings, direct couplings, or communication connections may be implemented using interfaces. The indirect couplings or communication connections between devices or units or components may be electrical, mechanical, or any other suitable type.

In the descriptions, when a unit or component is described as a separate unit or component, the separation may or may not be physical separation. The unit or component may or may not be a physical unit or component. The separate units or components may be located at a same place, or may be distributed at various nodes of a grid or network. The actual configuration or distribution of the units or components may be selected or designed based on actual need of applications.

Various functional units or components may be integrated in a single processing unit, or may exist as separate physical units or components. In some embodiments, two or more units or components may be integrated in a single unit or component. The integrated units may be realized using hardware, or may be realized using hardware and software functioning unit.

The integrated units realized using software functioning units may be stored in a computer-readable medium, such as a non-transitory computer-readable storage medium, including computer instructions or commands that are executable by a computing device (e.g., a personal computer, a server, or a network device, etc.) or a processor to perform various steps of the disclosed methods. The non-transitory computer-readable storage medium can be any medium that can store program codes, for example, a USB disc, a portable hard disk, a read-only memory (ROM), a random access memory (RAM), a magnetic disk, an optical disk, etc.

A person having ordinary skill in the art can appreciate that for convenience and simplicity, the above descriptions described the division of the functioning units. In practical applications, the disclosed functions may be realized by various functioning units. For example, in some embodiments, the internal structure of a device may be divided into different functioning units to realize all or part of the above-described functions. The detailed operations and principles of the device are similar to those described above, which are not repeated.

A person having ordinary skill in the art can appreciate that the above embodiments are only examples of the disclosed technology. The present disclosure is not limited to the examples provided. Although the above descriptions have explained the various embodiments of the present disclosure, a person having ordinary skill in the art can appreciate that one can modify the disclosed embodiments, or replace certain technical features with equivalent technical features. Such modification or replacement do not make the modified embodiments deviating from the scope of the present disclosure.

A person having ordinary skill in the art can appreciate that when the description mentions "an embodiment" or "an example," it means that characteristics, structures, or features related to the embodiment or example are included in at least one embodiment or example of the present disclosure. Thus, when the description uses "in an embodiment" or "in an example" or similar terms, it does not necessarily mean the same embodiment. Various characteristics, structures, or features of various embodiments may be combined in a suitable manner. Various characteristics, structures, or features of one embodiment may be incorporated in another embodiment.

A person having ordinary skill in the art can appreciate that the reference numbers for the steps of the methods does not necessarily indicate the sequence of execution of the steps. The sequence for executing the various steps is to be determined by the functions of the steps and the internal logic between the steps. The example sequence shown in the flow charts or discussed in the descriptions should not be construed as limiting the scope of the present disclosure.

A person having ordinary skill in the art can appreciate that when the term "and/or" is used, the term describes a relationship between related items. The term "and/or" means three relationships may exist between the related items. For example, A and/or B can mean A only, A and B, and B only. The symbol "/" means "or" between the related items separated by the symbol.

A person having ordinary skill in the art can appreciate that part or all of the above disclosed methods and processes may be implemented using related electrical hardware, or a combination of electrical hardware and computer software that may control the electrical hardware. Whether the implementation is through hardware or software is to be determined based on specific application and design constraints. A person of ordinary skill in the art may use different methods for different applications. Such implementations fall within the scope of the present disclosure.

A person having ordinary skill in the art can appreciate that descriptions of the functions and operations of the system, device, and unit can refer to the descriptions of the disclosed methods.

Other embodiments of the present disclosure will be apparent to those skilled in the art from consideration of the specification and practice of the embodiments disclosed herein. It is intended that the specification and examples be considered as example only and not to limit the scope of the present disclosure, with a true scope and spirit of the invention being indicated by the following claims. Variations or equivalents derived from the disclosed embodiments also fall within the scope of the present disclosure.

What is claimed is:

1. An unmanned aerial vehicle (UAV), comprising:
a central part;
a frame assembly including a linkage assembly and an arm, wherein:
the linkage assembly has a first connecting mechanism connected with the central part, a second connecting mechanism connected with the arm, a transmission mechanism mounted to the central part, and a primary link connected with the transmission mechanism, the first connecting mechanism is disposed at a first end of the linkage assembly, and the second mechanism is disposed at a second end of the linkage assembly opposite to the first end; and
the linkage assembly further comprises two ends connected to the central part and a secondary link of the arm, the secondary link being connected to the arm through a third connecting mechanism having a bent shape.

2. The UAV of claim 1,
wherein the predetermined position is a position between two limiting positions, and
wherein the two limiting positions are two end positions of the driving apparatus in two opposite rotating directions.

3. The UAV of claim 1, wherein the control apparatus is configured to control operations of the transmission mechanism.

4. The UAV of claim 3,
wherein the transmission mechanism comprises a screw-nut structure that comprises a screw and a nut coupled with the screw through threads, and
wherein when the driving apparatus drives the screw to rotate, the nut is configured to axially move along the screw.

5. The UAV of claim 3, wherein:
the arm is coupled to the linkage assembly at a distal end away from the transmission mechanism, wherein the arm is configured to support the propulsion assembly.

6. The UAV of claim 5,
wherein the primary link is configured to rotate relative to the central part under a force output by the transmission mechanism.

7. The UAV of claim 6,
wherein an end of the primary link adjacent the central part is pivotably connected with the central part through the first connecting mechanism, and
wherein a side surface of the primary link adjacent the central part is connected with the transmission mechanism through a second connecting mechanism.

8. The UAV of claim 7, wherein the second connecting mechanism comprises two opposing ends, one of the two opposing ends connected with the transmission mechanism, and the other one of the two opposing ends connected with the side surface of the primary link.

9. The UAV of claim 8,
wherein the second connecting mechanism has a substantially Y shape, and
wherein two ends of the Y-shape of the second connecting mechanism are pivotably connected with the side surface of the primary link, the remaining end of the Y-shape of the second connecting mechanism is pivotably connected with the transmission mechanism.

10. The UAV of claim 9, wherein the transmission mechanism comprises an extended shaft sleeve bracket pivotably connected with the second connecting mechanism.

11. The UAV of claim 9,
wherein an end of the primary link distant from the central part is connected with the arm through a substantially T-shaped connecting mechanism, the connecting mechanism comprising a fixing part that is connected with an end of the primary link through a sleeve that extends perpendicularly from the fixing part, the sleeve being mounted on the arm.

12. The UAV of claim 6,
wherein the arm is configured to rotate relative to the central part as the primary link rotates, and the secondary link is configured to rotate relative to the central part as the arm rotates.

13. The UAV of claim 12, wherein an end of the secondary link that is adjacent the central part is pivotably connected with the central part.

14. The UAV of claim 12, wherein the third connecting mechanism comprises:
a connecting part pivotably connected with an end of the secondary link; and
a sleeve disposed at an end of the connecting part that is distant from the secondary link, the sleeve being configured to mount onto the arm.

15. The UAV of claim 1, further comprising a cable connecting the electrical connector and the propulsion assembly, the cable being located within the frame assembly.

16. The UAV of claim 1, wherein a first pivot connection hole is disposed at the first connecting part, and the first connecting part is rotatably connected with the central part through the first pivot connection.

17. The UAV of claim 16, wherein:
a first shaft sleeve bracket is disposed at the central part, the first shaft sleeve including a first shaft sleeve hole; and
the first connecting part is rotatably connected with the central part through a shaft, rod, or pin inserted into the first pivot connection hole and the first sleeve hole.

18. The UAV of claim 17, wherein two first shaft sleeve brackets, and the first connecting part are disposed between the first shaft sleeve brackets.

19. The UAV of claim 17, wherein:
a nut of a transmission mechanism mounted to the central part is fixedly connected with the second shaft sleeve bracket, the second shaft sleeve bracket having a second shaft sleeve bracket hole and the control apparatus being configured to control operations of the transmission mechanism; and the second connecting part is connected to the nut through a shaft, a rod, or pin inserted into the second shaft sleeve bracket hole and a rotation shaft hole disposed at the main body.

20. The UAV of claim 1, wherein:

the second connecting part includes a main body part, a first rotation shaft hole and a second rotation shaft hole being disposed at the main body part;

the second connecting part is rotatably connected to an outer side wall of the first fixing part through the first rotation shaft hole; and the second connecting part is rotatably connected to a transmission mechanism through the second rotation shaft hole, wherein the transmission mechanism is mounted to the central part and the control apparatus is configured to control operations of the transmission mechanism.

* * * * *